(12) United States Patent
Hamkens

(10) Patent No.: US 9,358,734 B2
(45) Date of Patent: Jun. 7, 2016

(54) METHOD FOR MANUFACTURING A HEADLIGHT LENS FOR A VEHICLE HEADLIGHT

(71) Applicant: DOCTER OPTICS SE, Neustadt an der Orla (DE)

(72) Inventor: Jan Heiko Hamkens, Berlin (DE)

(73) Assignee: Docter Optics SE, Neustadt an der Orla (DE)

( * ) Notice: Subject to any disclaimer, the term of this patent is extended or adjusted under 35 U.S.C. 154(b) by 0 days.

(21) Appl. No.: 14/419,832

(22) PCT Filed: Aug. 7, 2013

(86) PCT No.: PCT/EP2013/002368
§ 371 (c)(1),
(2) Date: Apr. 23, 2015

(87) PCT Pub. No.: WO2014/072002
PCT Pub. Date: May 15, 2014

(65) Prior Publication Data
US 2015/0224723 A1    Aug. 13, 2015

(30) Foreign Application Priority Data

Nov. 9, 2012    (DE) .......................... 10 2012 021 921

(51) Int. Cl.
*B29D 11/00*    (2006.01)
*B29C 39/02*    (2006.01)
(Continued)

(52) U.S. Cl.
CPC .............. *B29D 11/00* (2013.01); *B29C 39/021* (2013.01); *B29C 43/14* (2013.01);
(Continued)

(58) Field of Classification Search
CPC ..................... B29C 39/04021; B29C 43/0414; B29L 2011/0016; B29L 2011/0075; B29L 2011/0083; B29L 2031/3055
USPC .......................................................... 264/2.2
See application file for complete search history.

(56) References Cited

U.S. PATENT DOCUMENTS

| | | |
|---|---|---|
| 3,211,811 A | 10/1965 | Lanman |
| 4,540,534 A | 9/1985 | Grendol |

(Continued)

FOREIGN PATENT DOCUMENTS

| | | |
|---|---|---|
| DE | 4128915 | 3/1992 |
| DE | 19829586 | 1/2000 |

(Continued)

OTHER PUBLICATIONS

International Preliminary Report on Patentability, Application No. PCT/EP2013/002368, dated May 12, 2015.

(Continued)

*Primary Examiner* — Joseph S Del Sole
*Assistant Examiner* — Thukhanh T Nguyen
(74) *Attorney, Agent, or Firm* — Barnes & Thornburg LLP

(57) ABSTRACT

The invention relates to a method for producing an optical lens element, more particularly for illumination purposes, more particularly for producing a headlamp lens for a vehicle headlamp, more particularly for a motor vehicle headlamp, according to which method liquid, transparent, more particularly amorphous, synthetic material is placed into a lower mold. The synthetic material is then pressed between the lower mold and an upper mold by putting the lower mold and the upper mold together. The lower mold and the upper mold are then separated. Further liquid, transparent, more particularly amorphous, synthetic material is then added to the pressed synthetic material and the synthetic material is then pressed, more particularly precision pressed, to form the lens element.

21 Claims, 9 Drawing Sheets

(51) Int. Cl.
  *B29C 43/14* (2006.01)
  *F21S 8/10* (2006.01)
  *B29L 11/00* (2006.01)
  *B29L 31/30* (2006.01)

(52) U.S. Cl.
  CPC ...... *B29D 11/00432* (2013.01); *F21S 48/1258* (2013.01); *B29L 2011/0016* (2013.01); *B29L 2031/3055* (2013.01)

(56) References Cited

U.S. PATENT DOCUMENTS

| | | | |
|---|---|---|---|
| 6,627,125 | B1 | 9/2003 | Nishikawa |
| 6,992,804 | B2 | 1/2006 | Lamy et al. |
| 8,601,835 | B2* | 12/2013 | Bonitz .................. C03B 11/08 65/66 |
| 8,944,649 | B2* | 2/2015 | Fedosik .............. F21S 48/1159 362/511 |
| 2004/0244421 | A1* | 12/2004 | Kato .................. B29C 33/3857 65/26 |
| 2005/0225991 | A1* | 10/2005 | Yamazaki ........... B29C 65/1635 362/362 |
| 2006/0284324 | A1 | 12/2006 | Bakker |
| 2010/0172146 | A1 | 7/2010 | Fischer |
| 2010/0202154 | A1* | 8/2010 | Hamkens .............. B29C 43/021 362/520 |

FOREIGN PATENT DOCUMENTS

| | | |
|---|---|---|
| DE | 10052653 | 5/2002 |
| DE | 10118687 | 10/2002 |
| DE | 10220671 | 12/2003 |
| DE | 69923847 T2 | 1/2006 |
| DE | 102007037204 | 2/2009 |
| DE | 102011100071 | 10/2012 |
| EP | 0272646 | 6/1988 |
| EP | 0488627 | 6/1992 |
| EP | 0640460 | 3/1995 |
| JP | 9057794 | 3/1997 |
| WO | 0231543 | 4/2002 |
| WO | 03074251 | 9/2003 |

OTHER PUBLICATIONS

English translation of International Preliminary Report on Patentability, Application No. PCT/EP2013/002368, dated May 12, 2015.
International Search Report and Written Opinion, Application No. PCT/EP2013/002368, dated Nov. 8, 2013.
Office Action issued on Oct. 24, 2013 in German Application No. 102012021921.0.

* cited by examiner

METHOD FOR MANUFACTURING A HEADLIGHT LENS FOR A VEHICLE HEADLIGHT

CROSS REFERENCE TO RELATED APPLICATIONS

This application is a U.S. nationalization under 35 U.S.C. §371 of International Application No. PCT/EP2013/002368, filed Aug. 7, 2013, which claims priority to German Application No. 102012021921.0, filed Nov. 9, 2012.

FIELD OF THE INVENTION

The invention relates to a method for manufacturing a headlight lens for a vehicle headlight.

BACKGROUND INFORMATION

DE 10 2007 037 204 A1 discloses a process for manufacturing an optical lens element, in particular for illumination purposes, particularly for manufacturing a headlight lens for a vehicle headlight, in particular for a motor vehicle headlight, wherein a blank is molded from transparent, particularly thermoplastic, in particular essentially liquid plastic material, in particular by means of an injection pressing process in an injection pressing mold, and wherein the blank is subsequently pressed, press-molded by means of a final shape/contour mold to form the lens element.

DE 41 28 915 A1 discloses an apparatus for casting a plastic lens, wherein a first casting mold having a concave optical surface, and a second casting mold having a convex optical surface are arranged such that the optical surfaces oppose each other, and wherein an adhesive tape is placed over the first as well as also over the second casting mold in order to configure a cavity between the casting molds. Plastic material is injected into this cavity and is finally hardened.

US 2006/0284324 A1 discloses a method for producing an optical structural component wherein the structural component is pressed after thermal softening.

U.S. Pat. No. 3,211,811 discloses an apparatus for producing a plastic-material lens, wherein a flexible molding element is arranged in a mold cavity, which element divides the mold cavity into two partial mold cavities, wherein the flexible mold element is configured such that it transmits a hydraulic force between the partial mold cavities.

DE 699 23 847 T2 discloses a process for manufacturing an optical mold body from thermoplastic resin by injection-press-molding, wherein the volume of a mold cavity expands more strongly than the volume of the optical mold body in question, and molten thermoplastic resin is injected into the mold cavity through an injection molding passage.

According to DE 699 23 847 T2, U.S. Pat. No. 4,540,534, EP 0 640 460 and JP 9-057794 disclose a method for manufacturing an optical mold body from thermoplastic resin by injection-press-molding.

DE 102 20 671 A1 discloses a plastic lens consisting of a collective lens of plastic material having a high Abbé number, and a dispersion lens connected therewith integrally and in positive fit, of plastic material having, when compared with the plastic material of the collective lens, a lower Abbé number, wherein the thermal expansion coefficients of the respective plastic materials are essentially the same.

Headlight lenses are known e.g. from WO 02/31543 A1, U.S. Pat. No. 6,992,804 B2, WO 03/074251 A1 and DE 100 52 653 A1. Further vehicle headlights are known e.g. from DE 100 33 766 A1, EP 0 272 646 A1, DE 101 18 687 A1 and DE 198 29 586 A1.

It is an object of the invention to reduce the costs for manufacturing of headlight lenses for vehicle headlights. It is, for example, an object of the invention to specify an improved vehicle headlight including a plastic lens and/or a motor vehicle with a correspondingly improved vehicle headlight.

SUMMARY

The aforementioned object is achieved by a method for manufacturing a headlight lens for a vehicle headlight for a vehicle headlight, wherein liquid transparent, for example amorphous, plastic material is supplied or fed to a lower mold, wherein the plastic material is subsequently pressed between said lower mold and an upper mold by moving together the lower mold and the upper mold (no injection pressing/molding) (in this context, the pressing occurs, in particular, neither in vacuum nor under significant low pressure. In particular, the pressing occurs under atmospheric air-pressure), wherein the lower mold and the upper mold are subsequently moved apart, wherein, subsequently, more liquid transparent, for example amorphous, plastic material is supplied or fed onto the pressed plastic material, and wherein the plastic material (together with the further liquid plastic material) is subsequently press-molded to form the lens element (no injection pressing/molding). Herein, the pressing, in particular, does not occur under vacuum or significant low-pressure. The pressing occurs, in particular, under atmospheric air-pressure.

The aforementioned pressing or press-molding of the lens element, respectively, occurs, in particular, by means of pressing through moving together again the lower mold and the upper mold or through moving together the lower mold and a further upper mold. In the sense of the invention, the term press-molding (also termed as bright-pressing or blank-molding) is, in particular, to be understood in a manner that an optically effective (or effective) surface is to be pressed (i.e. molded under pressure) such that any subsequent post-treatment (or finishing) of the contour of this optically effective surface may be dispensed with or does not apply or will not have to be provided for, respectively. In the sense of the invention, press-molding is no injection molding process. In the sense of the invention, press-molding is a pressing process achieved by moving together a lower mold and an upper mold.

In the sense of the invention, an (optical) lens element is particularly a collective lens.

The term "subsequently" is to be understood such that a step which "is subsequent" to another step will occur after such another step. Herein, the term "subsequent" is to be understood as indirect "following" as well as immediate "following". Herein, indirect "following" is to be understood such that intermediate steps may, as well, be provided for between the two steps, which are interconnected by "subsequent" or defined with respect to their chronological sequence, respectively.

The moving together of an upper mold and a lower mold may occur such that the upper mold moves towards the lower mold, that the lower mold moves towards the upper mold, or that the lower mold and the upper mold move towards each other.

The feeding or supplying of plastic material into the lower mold occurs, for example, by casting. The feeding or supplying of plastic material into the lower mold occurs, for example, by gravity.

The feeding or supplying of plastic material into the lower mold does for example not occur under pressure. The feeding or supplying of plastic material into the lower mold occurs, in particular, when the mold/cavity is not closed. The feeding or supplying of further plastic material onto the plastic material occurs, for example, by casting. The feeding or supplying of further plastic material onto the plastic material occurs, in particular, by gravity. The feeding or supplying of further plastic material onto the plastic material does in particular not occur under pressure. The feeding or supplying of further plastic material onto the plastic material occurs when the mold/cavity is not closed.

Advantageously, it is provided for that the upper mold is at least two-part. Herein, the upper mold comprises for example a first mold part, which is surrounded or enclosed by a second mold part.

In the sense of the invention, the further liquid plastic material is the same plastic material as the plastic material onto which the further liquid plastic material is being fed.

The completely pressed lens element therefore consists of only one type of plastic material or of a homogeneous mixture of individual plastic materials.

In a further embodiment of the invention the plastic material is cooled down actively and/or passively before and/or after moving apart the lower mold and the upper mold. In the sense of the invention, active cooling occurs for example by supplying a coolant/cooling medium. In the sense of the invention, passive cooling occurs for example by waiting (until the desired viscosity or temperature, respectively, will be obtained).

According to a further embodiment of the invention a light dispersing surface structure by means of the lower mold is embossed into an optically effective surface of the lens element. According to a further embodiment of the invention a light dispersing surface structure by means of the upper mold configured as a final shape (contour) mold by means of the further/other upper mold is embossed into an optically effective surface of the lens element. An appropriate light dispersing surface structure may e.g. comprise a modulation and/or a (surface) roughness of at least 0.05 µm, in particular at least 0.08 µm, or it may be configured as a modulation, if necessary having a (surface) roughness of at least 0.05 µm, in particular of at least 0.08 µm, respectively. In the sense of the invention, roughness is to be defined particularly as Ra, in particular according to ISO 4287. In a further embodiment of the invention, the light dispersing surface structure may comprise a structure simulating the surface of a golf ball, or it may be configured itself as a structure imitating a golf ball surface. Appropriate surface structures dispersing light are e.g. disclosed in DE 10 2005 009 556, DE 102 26 471 B4, and DE 299 14 114 U1. Further embodiments of surface structures dispersing light are disclosed in German Letters Patent 1 009 964, DE 36 02 262 C2, DE 40 31 352 A1, U.S. Pat. No. 6,130,777, US 2001/0033726 A1, JP 10123307 A, JP 09159810A, and JP 01147403 A.

The aforementioned problem is, moreover, solved by a vehicle headlight having at least one light source, wherein the vehicle headlight includes a headlight lens manufactured according to a process as has been described in the foregoing. In a yet further advantageous embodiment of the invention the vehicle headlight comprises a shield, wherein an edge of said shield can be imaged, by means of the headlight lens or a part of the headlight lens, as a bright-dark-borderline.

DETAILED DESCRIPTION

Figure 1:
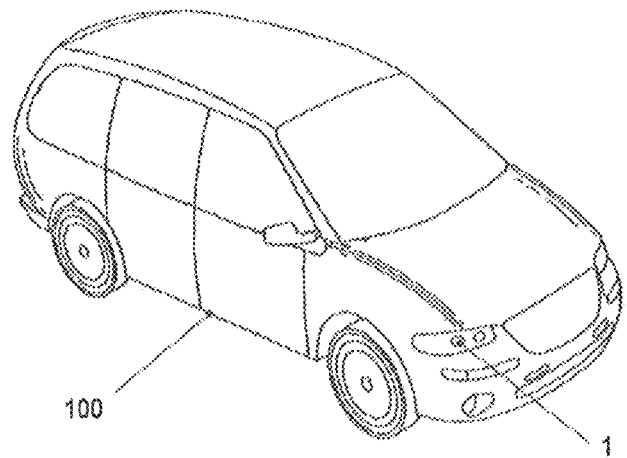
FIG. 1 shows an example of embodiment of a motor vehicle.
Figure 2:
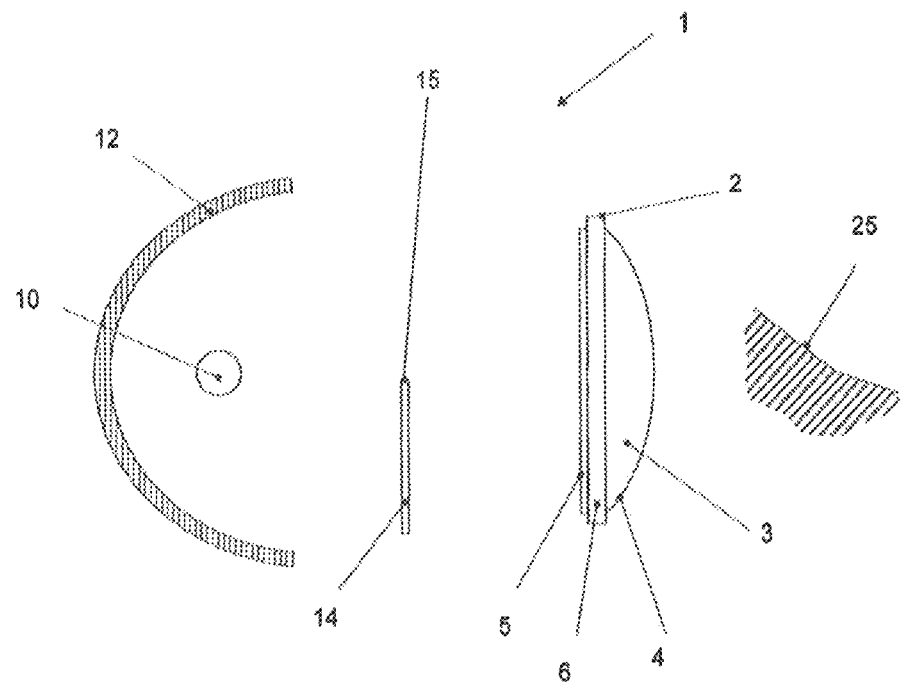
FIG. 2 shows a schematic representation of an exemplary vehicle headlight.
Figure 3:
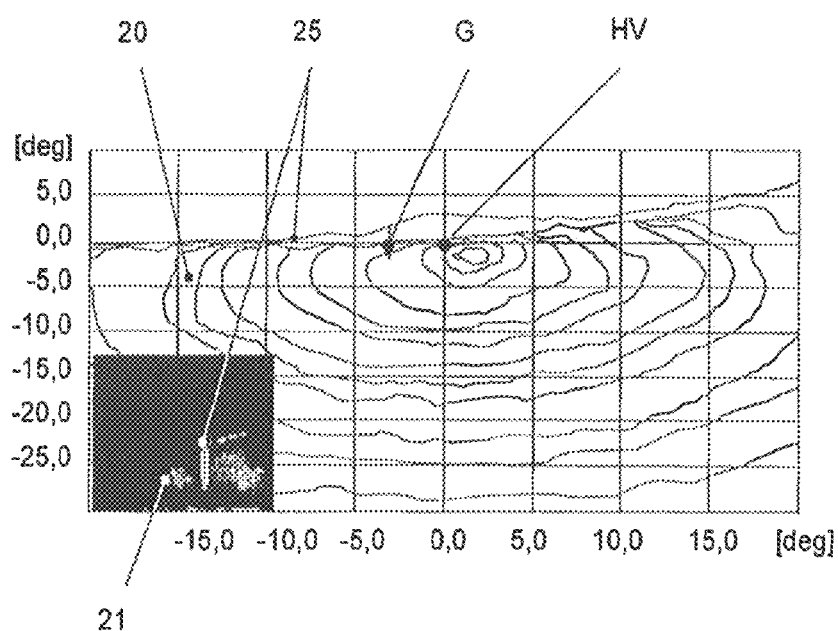
FIG. 3 shows an exemplary illumination distribution of the headlight according to FIG. 2.

FIG. 1 shows a motor vehicle 100 having a vehicle headlight 1 schematically depicted in FIG. 2 and including a light source 10 for generating light, a reflector 12 for reflecting light generated by means of the light source 10, and a shield 14. The vehicle headlight 1, moreover, comprises a monolithic headlight lens 2 press-molded (also termed blank-molded or bright-pressed) on both sides, for changing the beam direction of light to be generated by means of the light source 10, and for imaging an edge of the shield 14, which edge has been denominated by reference numeral 15 in FIG. 2, as a light (or bright)-dark-borderline 25, as has been represented, by way of example, in FIG. 3 in a diagram 20 and in a photograph 21. Herein, the gradient G of the bright-dark-borderline 25 and the glare (value) HV of the vehicle headlight 1 in which the headlight lens 2 has been installed, are important photometric guide values.

The headlight lens 2 comprises a lens body 3 made of transparent plastic material, which body comprises an essentially planar, optically (effective) surface 5 facing the light source 10, and a convexly curved optically effective surface 4 facing away from the light source 10. Moreover, the headlight lens 2 optionally comprises a rim 6, by means of which the headlight lens 2 can be attached within the vehicle headlight 1.

Figure 4:
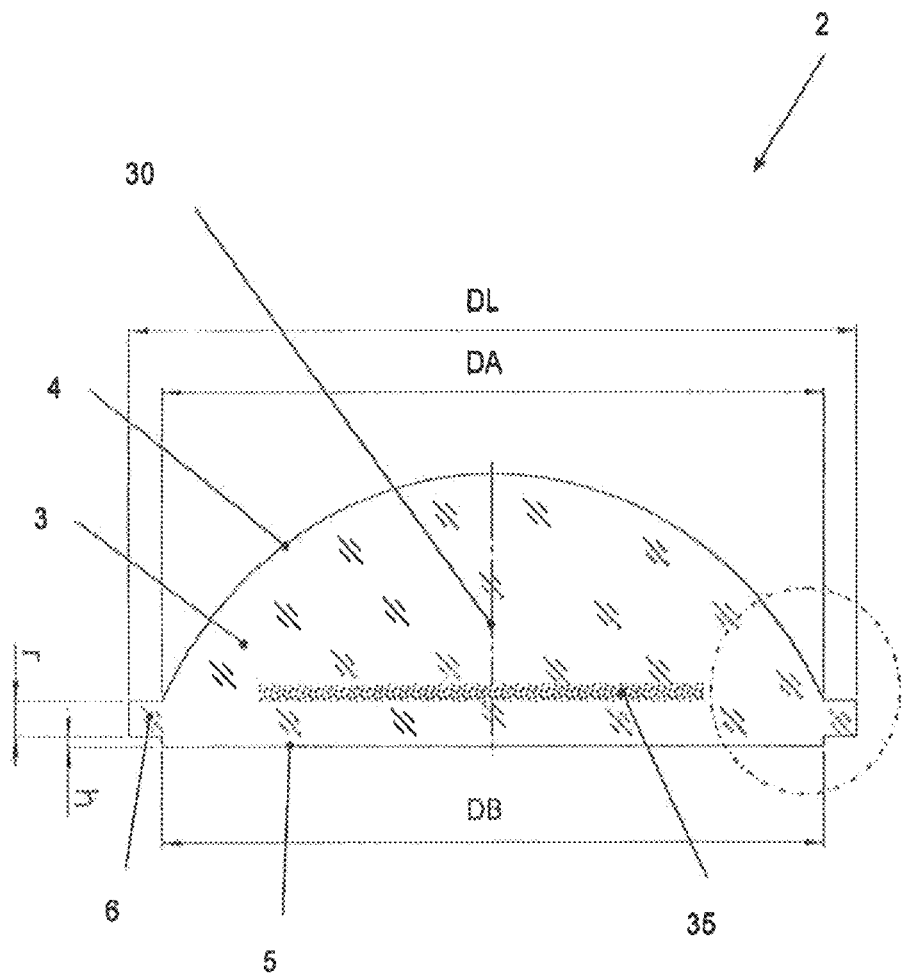
FIG. 4 shows a cross-section through an example of embodiment of a headlight lens for a vehicle headlight according to FIG. 2.
Figure 5:
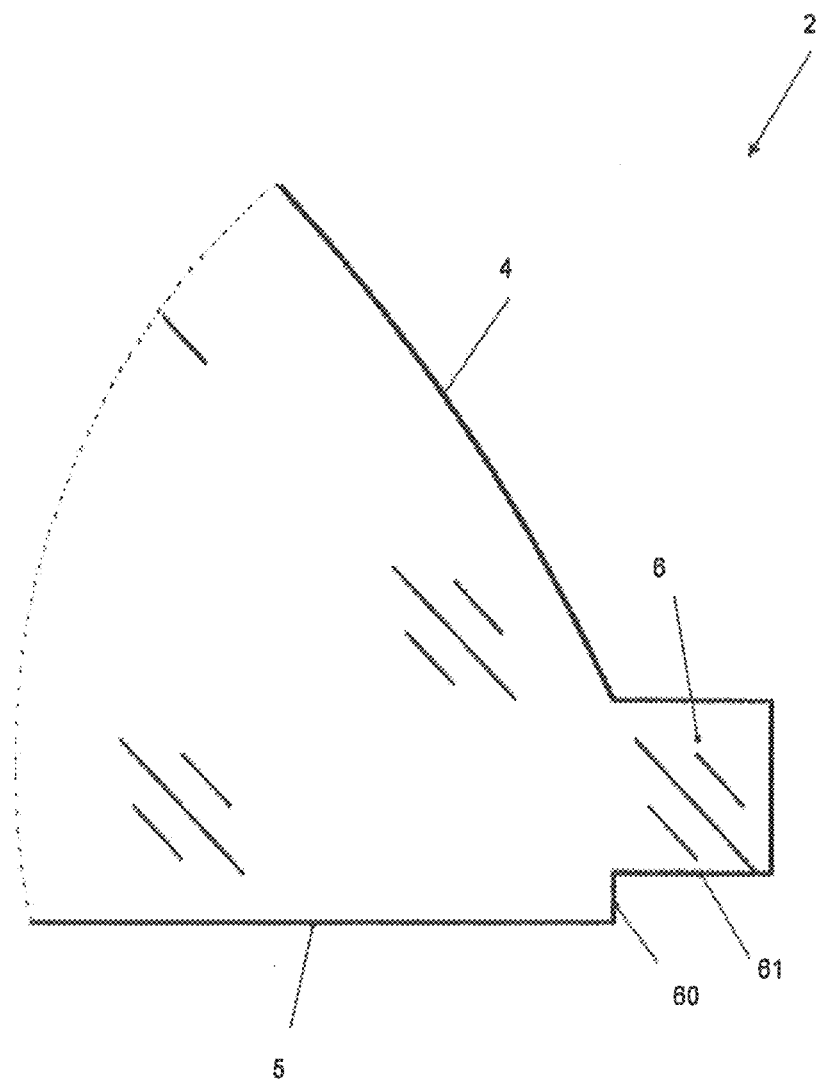
FIG. 5 shows a cut-out of the cross-section according to FIG. 4.

FIG. 4 shows a cross-section through an example of embodiment of the headlight lens 2 for the vehicle headlight 1 according to FIG. 2. FIG. 5 shows a cut-out of the headlight lens 2, which cut-out has been marked by means of a dash-dotted circle in FIG. 4. The essentially planar, optically effective surface 5, shaped as a step 60, projects, in the direction of the optical axis 30 of the headlight lens 2, beyond the rim 6 of the lens or beyond the surface 61 of the rim 6 of the lens, respectively, said surface 61 facing the light source 10, with the height h of step 60 amounting to no more than 1 mm, advantageously no more than 0.5 mm. The effective value of height h of step 60 expediently amounts to 0.2 mm.

The thickness r of the rim 6 of the lens amounts to at least 2 mm but to no more than 5 mm. The diameter DL of the headlight lens 2 amounts to at least 40 mm but to no more than 100 mm. The diameter DB of the essentially planar, optically effective surface 5 equals the diameter DA of the convexly curved, optically effective surface 4. In an expedient embodiment, the diameter DB of the essentially planar, optically effective surface 5 amounts to no more than 110% of the diameter DA of the convexly curved, optically effective surface 4. Moreover, the diameter DB of the essentially planar, optically effective surface 5 advantageously amounts to at least 90% of the diameter DA of the convexly curved, optically effective surface 4. The diameter DL of the headlight lens 2 is advantageously approximately 5 mm larger than the diameter DB of the essentially planar, optically effective surface 5 or than the diameter DA of the convexly curved, optically effective surface 4, respectively.

In the interior of the transparent body 3 the headlight lens 2 optionally has a light dispersing structure 35. The light dispersing structure 35 is advantageously a structure generated by means of a laser. In this context, it advantageously comprises a number of punctiform defects, which are aligned with respect to a plane, which is orthogonal with respect to the optical axis 30. It may be provided for that the light dispersing structure 35 is designed to be ring-shaped or that it comprises annular regions or that the punctiform defects are arranged in the manner of rings, respectively. It may be provided for that the punctiform defects are distributed at random, in particular within the selected structure.

For example, appropriate methods for generating the light dispersing structure 35 in the interior of the transparent body 3 may be taken from SU 1838163 A3, from SU 1818307 A1, from the article "Optical applications of laser-induced gratings in Eu-doped glasses", Edward G. Behrens, Richard C. Powell, Douglas H. Blackburn, 10 Apr. 1990/Vol. 29, No. 11/APPLIED OPTICS, from the article "Relationship between laser-induced gratings and vibrational properties of Eu-doped glasses", Frederic M. Durville, Edward G. Behrens, Richard C. Powell, 35, 4109, 1987, The American Physical Society, from the article "Laser-induced refractive-index gratings in Eu-doped glasses", Frederic M. Durville, Edward G. Behrens, Richard C. Powell, 34, 4213, 1986, The American Physical Society, from the article "Interior Treatment of Glass by means of Nd: YAG-Laser" ("Innenbearbeitung von Glas mit Nd: YAG-Laser"), Klaus Dickmann, Elena Dik, Laser Magazin, as well as from the state of the art cited in U.S. Pat. No. 6,992,804 B2.

In an alternative embodiment of the headlight lens 2, it may be provided for that (instead of the rim 6) the lens comprises a projecting rim (projecting in a rearward direction or in the direction of the side facing the light source 10, respectively), as has e.g. been disclosed in WO/03/087893 A1, DE 203 20 546 U1, EP 1 495 347 A1, DE 102 16 706 A1, EP 1645545, and DE 10 2004 048 500 A1.

It may be provided for the headlight lens 2 to have surface structures as have been disclosed in FIGS. 6 to 10 of DE 10 2007 037 204 A1.

Figure 6:
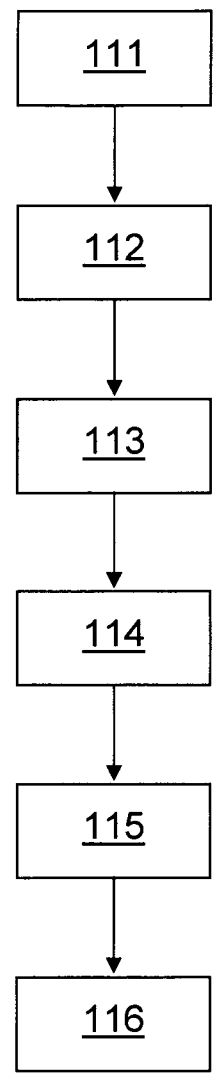
FIG. 6 shows an example of embodiment of a process for manufacturing a headlight lens according to FIG. 4.

FIG. 6 shows a process for manufacturing the headlight lens 2. Herein, by step 111 transparent thermoplastic plastic material is made available, produced or liquefied, respectively. The transparent thermoplastic plastic material is, in particular, a polycarbonate, for example LED 2643, or a thermoplastic resin, respectively, such as e.g. a polycarbonate resin, a polyacrylic resin or a modified polyolefin resin. Examples for appropriate thermoplastic plastic material or thermoplastic resin may be taken, for example, from DE 699 23 847 T2. As a polycarbonate resin, DE 699 23 847 T2 thus discloses the appropriate use of aromatic polycarbonate resin which has been obtained by processing a diphenol and a carbonate precursor. In this context, examples for the diphenol include bis-(hydroxylaryl)-alkanes such as 2,2-bis-(4-hydroxyphenyl)-propane (so-called bisphenol A), bis-(4-hydroxyphenyl)-methane, 1,1-bis-(4-hydroxyphenyl)-ethane, 2,2-bis-(4-hydroxyphenyl)-butane, 2,2-bis-(4-hydroxyphenyl)-octane, 2,2-bis-(4-hydroxyphenyl)-phenylmethane, 2,2-bis-(4-hydroxy-3-methylphenyl)-propane, 1,1-bis-(4-hydroxy-3-tert-butylphenyl)-propane, 2,2-bis-(4-hydroxy-3-bromophenyl)-propane, 2,2-bis-(4-hydroxy-3,5-dibromophenyl)-propane, and 2,2-bis-(4-hydroxy-3,5-dichlorophenyl)-propane; bis-(hydroxyphenyl)-cycloalkane such as 1,1-bis-(hydroxyphenyl)-cyclopentane and 1,1-bis-(hydroxyphenyl)-cyclohexane; dihydroxyarylethers such as 4,4'-dihydroxydi-phenyl-ether and 4,4'-dihydroxy-3,3'-dimethyldiphenylether; dihydrodiarylsulfides such as 4,4'-dihydroxydiphenylsulfide and 4,4'-dihydroxy-3,3'-dimethyldiphenylsulfide; dihydroxy-diaryl-sulfoxides such as 4,4'-dihydroxydiphenylsulfoxide and 4,4'-dihydroxy-3,3'-dimethyl-diphenylsulfoxide; and dihydroxydiarylsulfones such as 4,4'-dihydroxydiphenylsulfone and 4,4'-dihydroxy-3,3'-dimethyldiphenylsulfone. These diphenols may be used per se or by way of a combination of two or more products.

Figure 7:
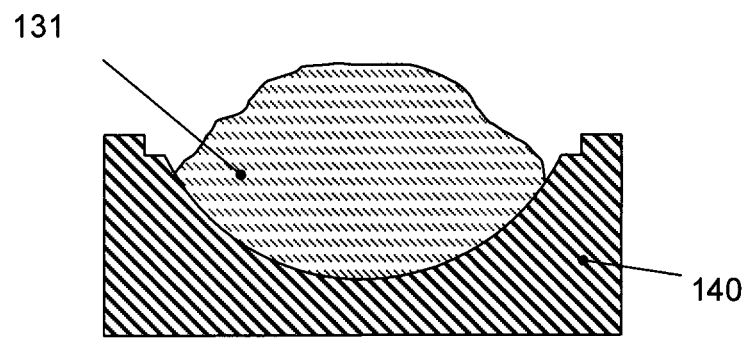
FIG. 7 shows an example of embodiment for the feeding of liquid transparent plastic material into a lower mold.
Figure 8:
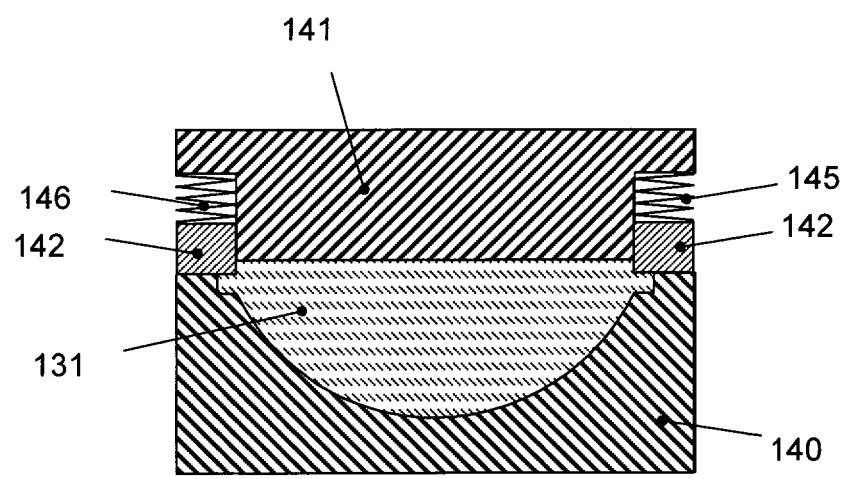
FIG. 8 shows an example of embodiment for the liquid transparent plastic material according to FIG. 7 in a mold closed by moving together the lower mold and an upper mold.

Following step 111, in step 112—as has been represented in FIGS. 7 and 8—the liquid transparent plastic material 131 is supplied into a lower mold 140. Step 113 follows, in which the plastic material 131—as has been represented in FIG. 8—is pressed between the lower mold 140 and an upper mold, the latter comprising a first partial mold 141 and a second partial mold 142 surrounding (or enclosing) the first partial mold 141, by moving together the lower mold 140 and the first partial mold 141 (and thus the second partial mold 142). Herein, the pressing, in particular, does not occur under vacuum or under significant low-pressure. The pressing, in particular, occurs under atmospheric air-pressure. The first partial mold 141 and the second partial mold 142 are interconnected with each other by means of springs 145 and 146.

Figure 9:
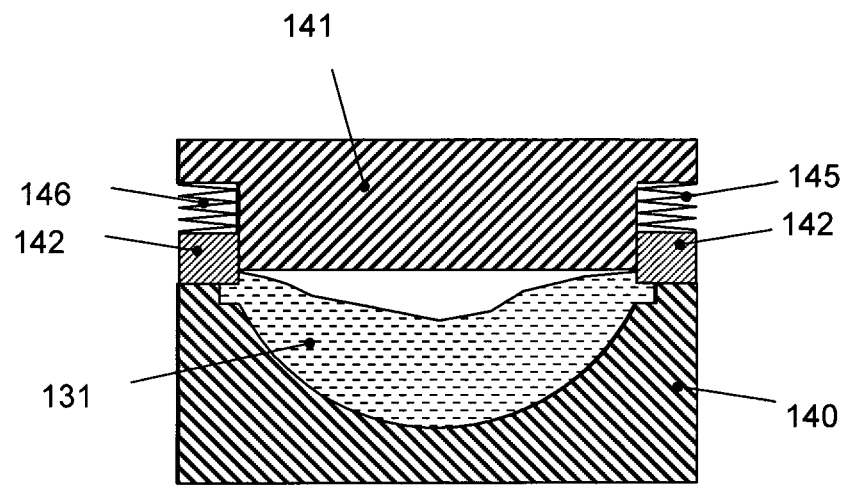
FIG. 9 shows an example of embodiment for the liquid transparent plastic material according to FIG. 8 in a cooled-down state.
Figure 10:
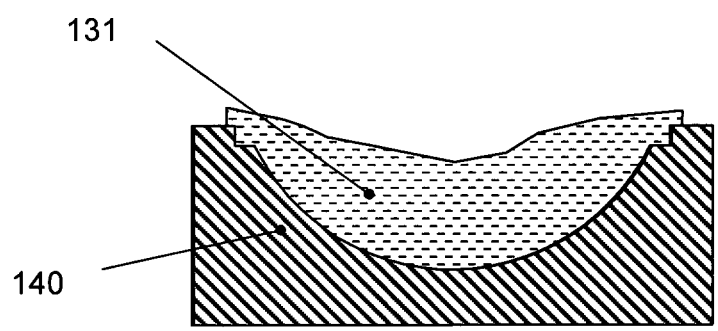
FIG. 10 shows a further example of embodiment for the liquid transparent plastic material according to FIG. 8 in a cooled-down state.

In subsequent step 114, the transparent plastic material 131 is cooled-down actively and/or passively with the mold closed—as is being represented in FIG. 9—and/or—as is being represented in FIG. 10—with the mold opened. For example, it has been provided for that the plastic material 131 is cooled down more intensely at its upper side than at its lower side. Moreover, it may be provided for that the transparent plastic material 131 is not (at all) or not essentially cooled-down on the side of the lower mold 140. Due to the cooling-down of the transparent plastic material 131 the viscosity thereof increases, which has been indicated by a change of the hatching chosen in contrast to that of FIGS. 7 and 8. As has been depicted in FIGS. 9 and 10, a reduction of volume due to shrinkage occurs at the upper surface of the transparent plastic material 131.

Figure 11:
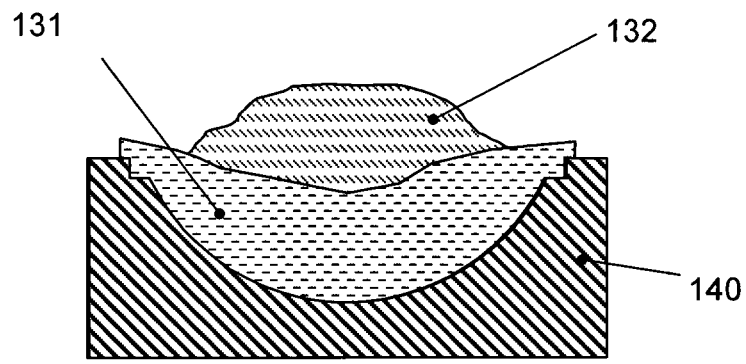
FIG. 11 shows an example of embodiment for the feeding of further liquid plastic material.

In a subsequent step 115—as represented in FIG. 11—, further transparent plastic material 132 is supplied onto the transparent plastic material 131. The transparent plastic material 132 is the same transparent plastic material as the transparent plastic material 131. In this context, the different hatching means that the transparent plastic material 131 has a lower temperature than the transparent plastic material 132 (at the time of adding the transparent plastic material 132).

Figure 12:
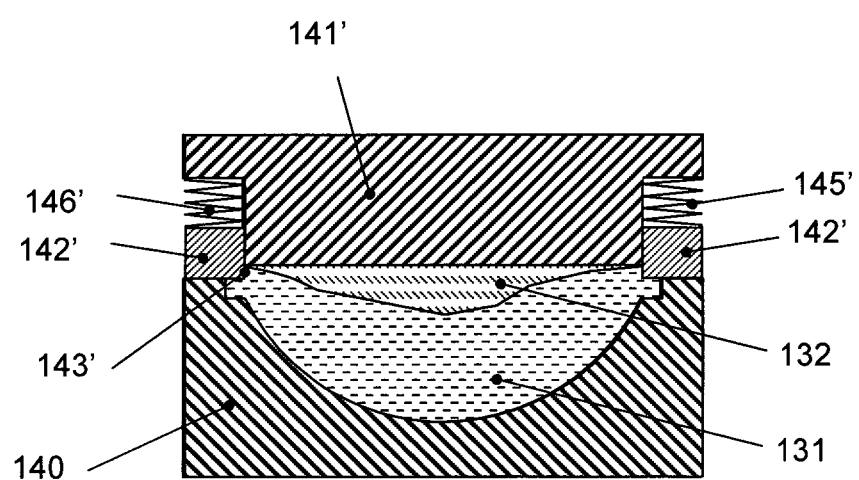
FIG. 12 shows an example of embodiment for the pressing of the further liquid transparent plastic material.
Figure 13:
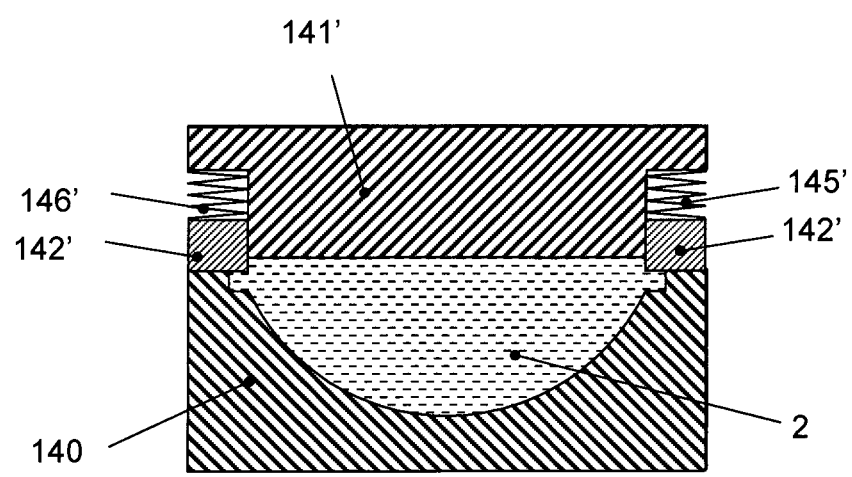
FIG. 13 shows the lens element according to FIG. 2 in a closed pressing mold.

A step 116 is to follow, in which the plastic material 131 and the plastic material 132—as has been represented in FIG. 12—are pressed (press-molded) between the lower mold 140 and an upper mold, the latter comprising a first partial mold 141' and a second partial mold 142' surrounding/enclosing the first partial mold 141' —as has been represented in FIG.

13—to form a molded-on lens rim 6 by moving together the lower mold 140 and the first partial mold 141' (and thus the second partial mold 142'), wherein, by means of an offset 143' between the first partial mold 141' and the second partial mold 142' and depending on the volume of plastic material 131 and plastic material 132, the step 60 is pressed into the headlight lens 2. In this context, it should be noted that the pressing, in particular, does not occur under vacuum or significant low-pressure. The pressing particularly occurs under atmospheric air-pressure. The first partial mold 141' and the second partial mold 142' are interconnected with each other by means of springs 145' and 146'.

It may be provided for that the first partial mold 141 may be used instead of the first partial mold 141', that the second partial mold 142 may be used instead of the second partial mold 142', and that the springs 145 and 146 may be used instead of the springs 145' and 146'. The first partial mold 141' and the first partial mold 141 and/or the second partial mold 142' and the second partial mold 142 may be configured to be similar or different.

The standard deviation of the gradient of the headlight lenses corresponding to headlight lens 2 is smaller than or equal to 0.005. The standard deviation of the glare (value) of the batch of headlight lenses 2 or of the vehicle headlights, respectively, in which the headlight lenses 2 are to be installed, is advantageously smaller than or equal to 0.05 lux. In a yet further embodiment, it is provided for that the standard deviation of the value 75R of the headlight lenses 2 or of the vehicle headlights, in which the headlight lenses 2 have been installed, is to be smaller than or equal to 0.5 lux.

The elements in the figures have been drawn in consideration of simplicity and clearness and not necessarily to scale. Thus, for example, the order of magnitude of some elements has been exaggerated with respect to other elements in order to enhance comprehension of the example of embodiment of the present invention.

The invention claimed is:

1. A method for manufacturing a collective headlight lens for a vehicle headlight for imaging a light-dark-borderline on a roadway, the method comprising:
    providing an upper mold comprising a first partial mold and a second partial mold, which first partial mold is surrounded by the second partial mold;
    providing a lower mold;
    supplying liquid transparent plastic material to the lower mold;
    subsequently pressing the plastic material between the lower mold and the upper mold by moving together the lower mold and the upper mold;
    subsequently moving apart the lower mold and the upper mold;
    cooling the upper surface of the pressed plastic material without cooling of the lower surfaces of the pressed plastic material;
    subsequently supplying more of the liquid transparent plastic material is onto the pressed plastic material; and
    subsequently press-molding the plastic material to form the collective headlight lens for imaging a light-dark-borderline on a roadway, the headlight lens consisting of only one of the group consisting of one type of plastic material and of a homogeneous mixture of individual plastic materials.

2. Method as claimed in claim 1, wherein press-molding the plastic material to form the collective headlight lens occurs by moving together the lower mold and the upper mold.

3. Method as claimed in claim 2, wherein the plastic material is cooled down before moving apart the lower mold and the upper mold.

4. Method as claimed in claim 1, wherein the plastic material is cooled down before moving apart the lower mold and the upper mold.

5. Method as claimed in claim 1, wherein the plastic material is cooled down after moving apart the lower mold and the upper mold.

6. Method as claimed in claim 1, wherein a light dispersing surface structure is embossed into an optically effective surface of the collective headlight lens by means of the lower mold.

7. Method as claimed in claim 6, wherein the plastic material is cooled down before moving apart the lower mold and the upper mold.

8. Method as claimed in claim 7, wherein press-molding the plastic material to form the collective headlight lens occurs by moving together the lower mold and the upper mold and embossing a light dispersing surface structure into another optically effective surface of the collective headlight lens by means of the upper mold.

9. Method as claimed in claim 1, wherein press-molding the plastic material to form the collective headlight lens occurs by moving together the lower mold and the upper mold and embossing a light dispersing surface structure into an optically effective surface of the collective headlight lens by means of the upper mold.

10. A method for manufacturing a collective headlight lens for a vehicle headlight for imaging a light-dark-borderline on a roadway, the method comprising:
    providing a first upper mold; providing a second upper mold;
    providing a lower mold;
    supplying liquid transparent plastic material to the lower mold;
    subsequently pressing the plastic material between the lower mold and the first upper mold by moving together the lower mold and the first upper mold;
    subsequently moving apart the lower mold and the first upper mold;
    cooling the upper surface of the pressed plastic material while keeping the pressed plastic material in the lower mold;
    subsequently supplying more of the liquid transparent plastic material onto the pressed plastic material; and
    subsequently press-molding the plastic material to form the collective headlight lens by moving together the lower mold and the second upper mold to form the headlight lens for imaging a light-dark-borderline on a roadway.

11. Method as claimed in claim 10, wherein the plastic material is cooled down before moving apart the lower mold and the first upper mold.

12. Method as claimed in claim 10, wherein the plastic material is cooled down after moving apart the lower mold and the first upper mold.

13. Method as claimed in claim 10, wherein a light dispersing surface structure is embossed into an optically effective surface of the collective headlight lens by means of the lower mold.

14. Method as claimed in claim 10, wherein a light dispersing surface structure is embossed into an optically effective surface of the collective headlight lens by means of the second upper mold.

15. Method as claimed in claim 14, wherein a light dispersing surface structure is embossed into another optically effective surface of the collective headlight lens by means of the lower mold.

16. Method as claimed in claim 14, wherein the second upper mold comprises a first partial mold and a second partial mold, which first partial mold is surrounded by the second partial mold.

17. Method as claimed in claim 10, wherein the first upper mold comprises a first partial mold and a second partial mold, which first partial mold is surrounded by the second partial mold.

18. Method as claimed in claim 17, wherein the second upper mold comprises a third partial mold and a forth partial mold, which third partial mold is surrounded by the forth partial mold.

19. A method for manufacturing a vehicle headlight with a lens for imaging a light-dark-borderline on a roadway, the method comprising:
  providing at least one light source;
  providing a shield;
  supplying liquid transparent plastic material to a lower mold;
  subsequently pressing the plastic material between the lower mold and an upper mold by moving together the lower mold and the upper mold;
  subsequently moving apart lower the mold and the upper mold;
  cooling the upper surface of the pressed plastic material while keeping the pressed plastic material in the lower mold;
  subsequently supplying more of the liquid transparent plastic material is onto the pressed plastic material;
  subsequently press-molding the plastic material to form a headlight lens; and,
  positioning the headlight lens such that an edge of the shield can be imaged as a bright-dark-borderline by means of the headlight lens.

20. Method as claimed in claim 19, wherein a light dispersing surface structure is embossed into an optically effective surface of the collective headlight lens by means of the lower mold.

21. Method as claimed in claim 19, wherein the vehicle headlight comprises a reflector for reflecting light generated by means of the light source.

* * * * *